United States Patent Office 3,475,084
Patented Oct. 28, 1969

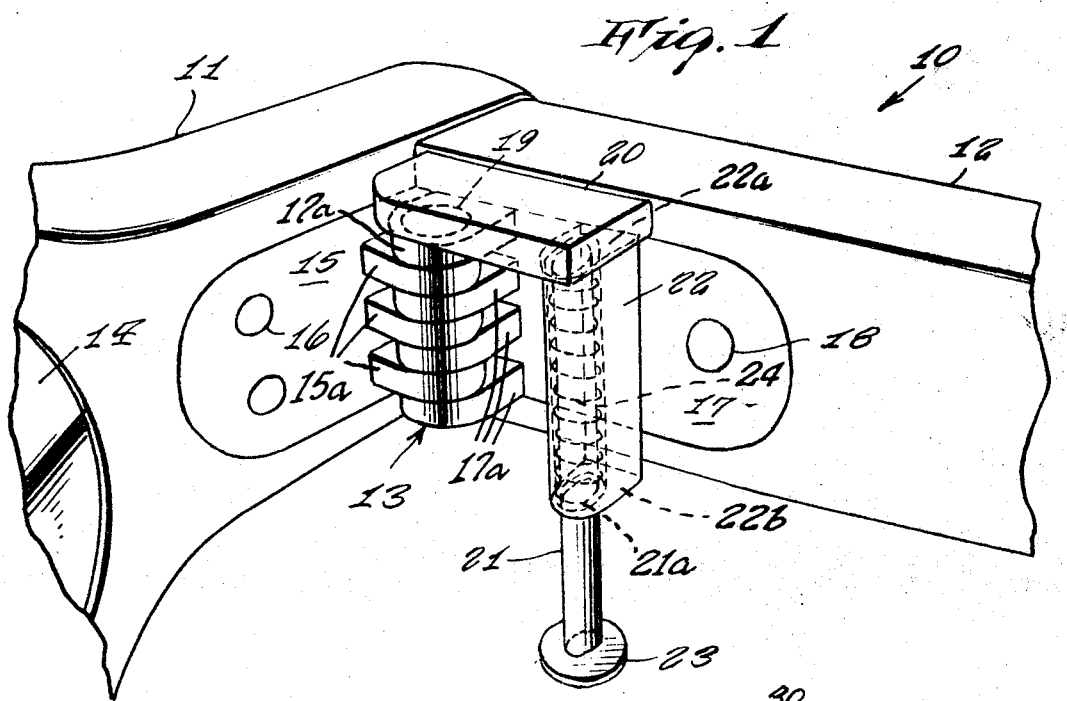
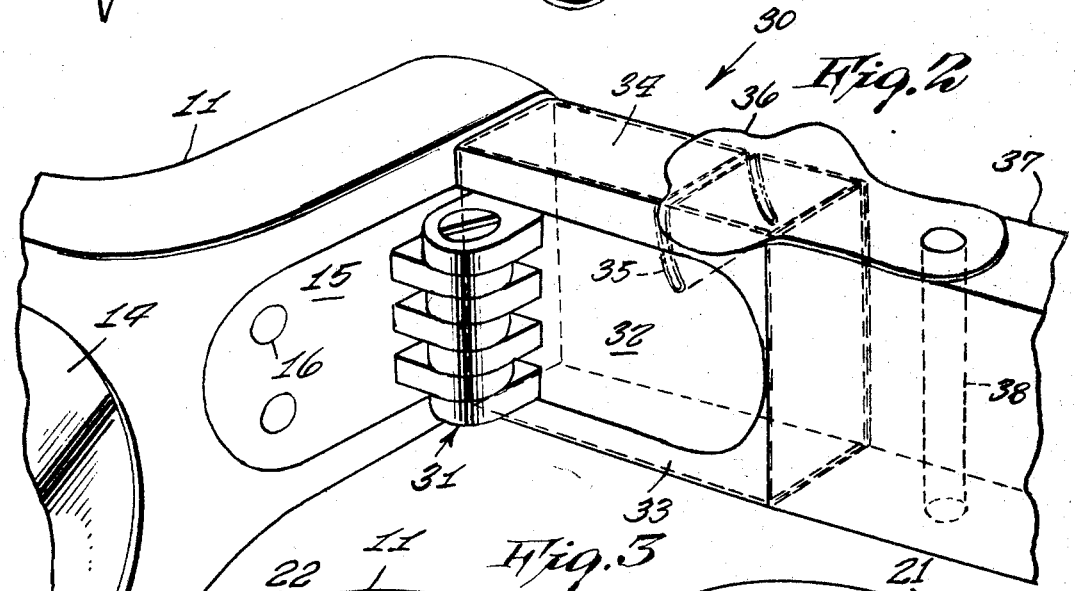

3,475,084
DETACHABLE EYEGLASS TEMPLE BARS
Randi Gil and Paul Gil, both of 149 3rd St.,
Hicksville, N.Y. 11801
Filed Dec. 9, 1966, Ser. No. 600,425
Int. Cl. G02c 5/14, 5/22
U.S. Cl. 351—116                               1 Claim

ABSTRACT OF THE DISCLOSURE

An eyeglass frame and readily detachable temples connected thereto having a separable hinge connection therebetween. Each hinge connection includes a pair of hinge plate members, both hinge plate members having spaced lugs at the adjacent ends thereof arranged to interfit and over-lap each other in vertical relationship; the lugs being provided with openings that are aligned to freely receive a hinge pin. A metal bar is carried by each temple above its hinge plate member and projects outwardly therefrom in the same direction as the hinge lugs and is so disposed as to seat on the uppermost hinge lug. Fixedly secured to each metal bar is the upper end of its associated hinge pin. A spring pressed plunger is carried by each temple and is associated with each metal bar to hold the metal bar in a down position with the hinge pin connecting the hinge plate members. Thus the pressure of the coil spring acts to hold the hinge parts in assembled relation and upward axial pressure on the plunger will raise the metal bar to lift the hinge pin clear of the hinge lugs to thereby permit detachment of the temple from the eyeglass frame.

---

This invention relates generally to eyeglasses. More specifically it relates to eyeglass frames having temple bars.

A principal object of the present invention is to provide an eyeglass frame having detachable temple bars, so as to provide comfort to persons who wish to read while they lie down on their sides, thereby eliminating the presence of a temple bar pressing against the side of their head.

Another object is to provide an eyeglass frame with detachable temple bars wherein either temple bar may be selectively detached while the other is retained in engaged position with the frame.

Other objects are to provide an eyeglass frame having detachable temple bars which is simple in design, inexpensive to manufacture, rugged in construction, easy to use and efficient in operation.

These and other objects will be readily apparent upon a study of the following specification and the accompanying drawing wherein:

FIGURE 1 is a fragmentary perspective view of a pair of eyeglasses showing the hinge construction supporting the temple bar to the eyeglass frame, FIGURE 2 is a similar view of a modified construction thereof, and FIGURE 3 is a front elevational view of the eyeglass frame of FIGURE 1.

Referring now to the drawing in detail, and more specifically to FIGURE 1, the reference numeral 10 represents an eyeglass frame with detachable temple bars wherein there is an eyeglass frame member 11 and a pair of temple bars 12 hingedly secured thereto by means of hinges 13.

The eyeglass frame comprises a singular member supporting a pair of lens 14. One hinge plate 15 of each hinge 13 is secured by means of rivets 16 to each end of the frame 11, the corresponding hinge plate 17 of each hinge being secured by rivet 18 to one end of each temple bar 12. A hinge pin 19 for each hinge connects the hinge plates pivotably free together, the upper end of each hinge pin 19 being rigidly connected to a metal bar 20a. As seen in FIG. 1, the metal bar 20 is of a length less than the length of hinge plate 17 and the hinge pin 19 is suitably rigidly secured to the underside of the metal bar 20 at its inner end and in substantially vertical relation thereto. Each of the hinge plates 15, 17 are provided with projecting interfitting and/or overlapping hinge lugs 15a and 17a, respectively, having aligned openings to receive the hinge pin 19 which is dimensioned such as to slidably fit therein. At the other end of the metal bar 20 and parallel to hinge pin 19 is a plunger 21 having its upper end suitably secured to the metal bar.

Fixed to each hinge plate 17 is a plunger housing 22 having a top wall 22a preferably level with the top surface of the uppermost hinge lug 17a. An opening is provided in the top wall through which the plunger 21 extends. A like lower wall 22b with an opening for the plunger is provided at the bottom of the plunger housing. The plunger 21 extends below the lower wall 22b and is provided at its lower terminal end with a finger engaging button 23. The plunger 21 is preferably oval in cross-section a. A compression coil spring 24 within each plunger housing surrounds its associated plunger portion therewithin and has its upper end seated against the upper wall 22a of the plunger housing and its lower end supported in any suitable manner on the plunger at the point 21a thereof at the bottom of the plunger housing to thereby urge and maintain metal bar 20 carrying hinge pin 19 in seated engagement on upper hinge lug 17a and the upper wall 22a of the plunger housing 22. In this position the hinge pin 19 is entirely within the aligned openings of the hinge lugs 15a, 17a to hingedly connect the temple 12 to the eyeglass frame 11.

In operative use, when it is desired to detach one or both of the temple bars 12 from the frame 11, an upward push by finger pressure on finger button 23 of the temple bar 12 will move plunger 21 upwardly within its plunger housing, compressing coil spring 24, to elevate the metal bar 20 and to correspondingly raise the hinge pin 19 and disengage from the hinge lugs 15a, 17a and allow the hinge plates 15, 17 to separate, thus permitting the temple bar to be detached from the frame 11. When it is desired to connect the temple bar to the frame, the plunger 21 is held depressed with the hinge pin 19 in raised position, the hinge lugs 15a, 17a are then brought into mating aligned position and release of finger pressure on the plunger will allow the compression force of coil spring 24 to move the plunger 21 down, carrying metal bar 20 down and bringing the hinge pin 19 carried by the metal bar 20 slidably into the aligned openings of the hinge lugs 15a, 17a.

In FIGURE 2, a modified construction 30 is shown wherein there is a hinge 31, one plate 32 of which has a metal box 33 welded thereto. The box top 34 has a convex opening 35 therein to adapt a metal leaf spring 36 that is attached to the top of the temple bar 37. The spring 36 is of stainless steel and welded to a bolt 38 going through the plastic portion of the temple bar 37. The attachment of the spring to the temple bar depends upon the kind of metal used.

The front part of the bar 37 is cut to fit all the way into the metal box opening. It also has a convex insert opening lined up with that of the box.

In operative use, the bar 37 is inserted into the metal box in a tight fit, the spring 36 locking the bar 37 therein into one tight unit. By lifting up the spring 36, the bar can be pulled out of the box and disconnected therewith.

Thus there has been provided an eyeglass frame with detachable temple bars that will offer an additional advantageous feature to a wearer.

Having described our invention, what we claim as new and desire to secure by Letters Patent is:

1. An eyeglass frame having detachable temple bars comprising:
   (a) a pair of hinge members each having a pair of hinge plates and a plurality of vertically spaced hinge lugs for interfitting overlapping engagement in a vertical row,
   (b) there being an opening in each hinge lug with all the openings in axial alignment,
   (c) the hinge plates of each pair being respectively secured to the eyeglass frame and to the end of the temple bars adjacent thereto,
   (d) an elongated flat vertically movable metal bar for each temple bar,
   (e) an elongated hinge pin secured to and depending from one end of each said movable bar and of sufficient length to engage all of said openings in said overlapping hinge lugs,
   (f) a plunger of oval cross-section movably supported on each said temple bar connected to the other end of the movable bar associated with the temple bar and parallel to the hinge pin carried thereby,
   (g) a plunger housing secured to each hinge plate fixed to a temple bar,
   (h) said plungers being each mounted within a plunger housing for axial vertical movement therethrough and projecting downwardly beyond the lower end of its associated housing a distance at least equal to the length of said hinge pin,
   (i) a finger button on the lower terminal end of each plunger,
   (j) a compression coil spring within each said plunger housing surrounding the plunger portion therein reacting between a fixed part of the housing and a part of said plunger portion to urge the plunger in an axial direction downwardly of said plunger housing, whereby with the hinge pin in operative assembled relation with the hinge lugs, said movable bar is held seated horizontally on the topmost hinge lug and the top of the plunger housing, by the action of the spring, and pressure action applied to the finger button will elevate the movable bar to wholly retract the hinge pin from the mating hinge lugs of a hinge member to permit separation thereof to disconnect a temple bar from the eyeglass frame.

References Cited

UNITED STATES PATENTS

| 3,385,646 | 5/1968 | Johnson | 351—153 |
| 1,284,071 | 11/1918 | Dorney | 351—116 |
| 3,031,925 | 5/1962 | Barrington | 351—116 |

FOREIGN PATENTS

| 841,231 | 6/1952 | Germany. |
| 1,423,840 | 11/1965 | France. |

DAVID H. RUBIN, Primary Examiner

U.S. Cl. X.R.

351—121, 153